(12) United States Patent
Lillis et al.

(10) Patent No.: US 8,436,749 B2
(45) Date of Patent: May 7, 2013

(54) FAILSAFE LED CONTROL SYSTEM

(75) Inventors: Mark Lillis, South Windsor, CT (US); Edward J. Kysar, III, Burlington, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 408 days.

(21) Appl. No.: 12/938,952

(22) Filed: Nov. 3, 2010

(65) Prior Publication Data

US 2012/0105253 A1    May 3, 2012

(51) Int. Cl.
G08B 21/00    (2006.01)

(52) U.S. Cl.
USPC ........... 340/945; 340/956; 340/963; 340/973; 340/979; 340/980; 345/1.1; 345/3.4; 345/46; 345/82; 345/691

(58) Field of Classification Search ................... 340/945, 340/956, 963, 973, 979, 980; 345/1.1, 3.44, 345/46, 82, 691
See application file for complete search history.

(56) References Cited

U.S. PATENT DOCUMENTS

| | | | |
|---|---|---|---|
| 3,654,806 A | 4/1972 | Bateman | |
| 4,147,056 A | 4/1979 | Muller | |
| 4,604,711 A | 8/1986 | Benn et al. | |
| 4,680,587 A | 7/1987 | Chisholm | |
| 5,459,478 A | 10/1995 | Bolger et al. | |
| 6,122,575 A | 9/2000 | Schmidt et al. | |
| 6,422,723 B1 | 7/2002 | Walters | |
| 6,549,179 B2 | 4/2003 | Youngquist et al. | |
| 6,680,834 B2 | 1/2004 | Williams | |
| 6,841,947 B2 | 1/2005 | Berg-johansen | |
| 6,987,787 B1 | 1/2006 | Mick | |
| 7,176,948 B2 | 2/2007 | Lewis | |
| 7,342,577 B2 | 3/2008 | Struebel et al. | |
| 2003/0214242 A1* | 11/2003 | Berg-johansen | 315/169.3 |
| 2007/0109328 A1* | 5/2007 | Lewis | 345/691 |

FOREIGN PATENT DOCUMENTS

EP    1 986 470 A2    10/2008

OTHER PUBLICATIONS

Extended European Search Report from EP Application No. 12166317.3; dated Aug. 14, 2012; 5 pages.

* cited by examiner

*Primary Examiner* — Tai T Nguyen
(74) *Attorney, Agent, or Firm* — Kinney & Lange, P.A.

(57) ABSTRACT

A display system comprises first and second LED panels for displaying first and second priority aviation data, a power supply, a modulator, a processor and a logic gate. The modulator generates a modulated voltage for the second LED panel, where the second priority data are displayed at a modulated brightness. The processor controls the modulator, and generates a status signal indicating a failure condition of the modulated voltage. The logic gate switches the first LED panel from the modulated voltage to the unmodulated voltage based on the status signal, where the first priority data default from the modulated brightness level to full brightness based on the failure condition.

20 Claims, 2 Drawing Sheets

FAILSAFE LED CONTROL SYSTEM

BACKGROUND

This invention concerns dimming and brightness control for light-emitting diode (LED) display panels. In particular, the invention concerns a brightness control system for an LED panel with segregated display functions.

LED devices are utilized in a range of display applications including electronics, industrial control systems, and transportation. LED displays are also utilized in aviation, including LED-based cockpit display systems for military and commercial aircraft.

In aviation applications, LED lighting levels are adjusted for ambient light conditions in order to allow operators to see well without glare or distraction. When the ambient lighting level is low, the LED panel lights should be relatively dim, and when the ambient lighting level is high, the LED panel lights should be relatively bright. LEDs, however, require more complex brightness control electronics that simple incandescent bulbs. The display systems can also be complex, and incorporate a number of different safety and reliability-critical components.

SUMMARY

This invention concerns a display system with a first LED panel for first priority aviation data, a second LED panel for second priority aviation data, a power supply for the LED panels, a modulator, a processor and a logic gate. The modulator generates a modulated voltage for the second LED panel, which displays the second priority data at a modulated brightness level. The processor controls the modulator, and generates an error signal based on the condition of the modulated voltage.

The logic gate switches the first LED panel from the modulated voltage to an unmodulated voltage based on the error signal. When the error signal indicates a failure of the modulated voltage, this switches the first priority data from the modulated brightness level to a full default brightness level.

DETAILED DESCRIPTION

Figure 1:
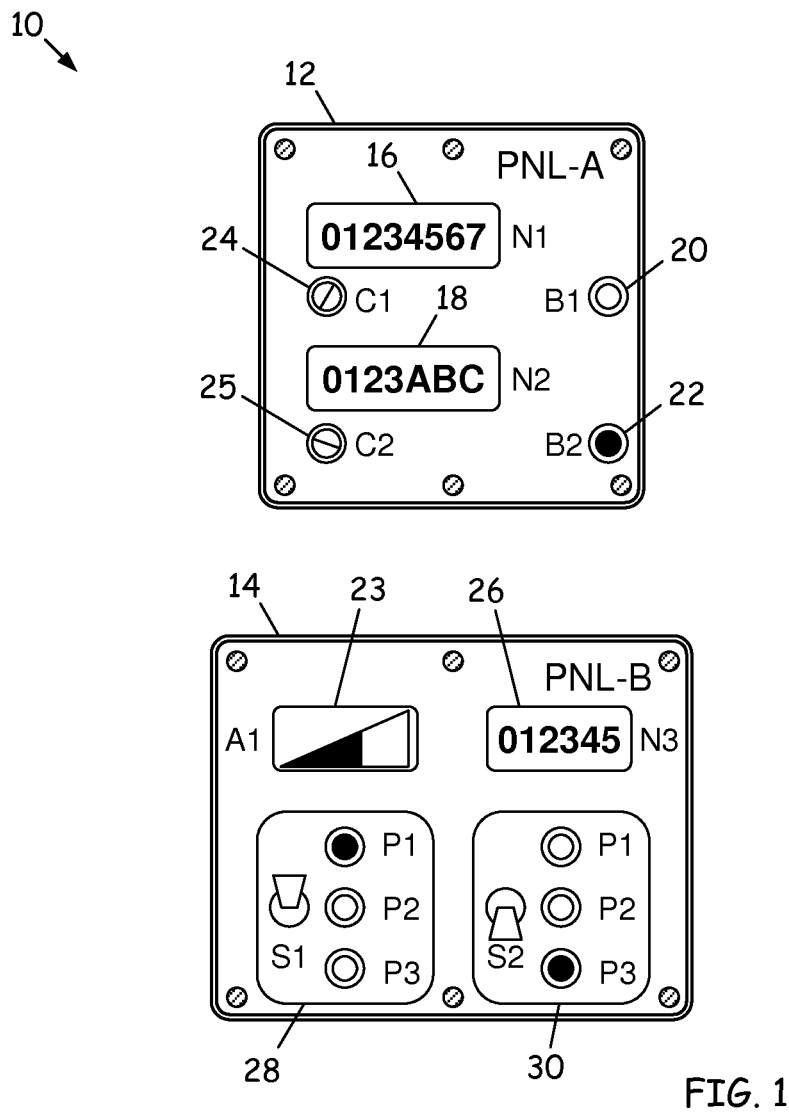
FIG. 1 is a schematic view of a cockpit display.

FIG. 1 is a schematic view of aviation display system or cockpit display 10. Display system 10 comprises segregated LED panel displays 12 (PNL-A) and 14 (PNL-B).

Panel A display 12 provides aviation data having a first priority, and panel B display 14 provides aviation data having a second priority. Display 10 controls the brightness of individual panel displays 12 and 14, and includes a failsafe power logic module to preserve selected data in the event of a processor error or other system failure.

Panel displays 12 and 14 each comprise a number of LED elements for aviation data. In the particular embodiment of FIG. 1, panel A display 12 includes numeric or alphanumeric LED displays 16 and 18 (labeled N1 and N2), and binary LED indicators 20 and 22 (B1 and B2). Panel B display 14 includes analog display 23 (A1), numeric or alphanumeric display 26 (N3), and multi-element binary LED elements 28 and 30, each with a number of individual LED indicators (P1, P2 and P3).

The particular configurations of panel displays 12 and 14 vary with application, and with the aviation data of interest. In some embodiments, for example, alphanumeric displays 16 and 18 provide altitude or pressure data on Panel A display 12, for example flight altitude and cabin pressure, where the cabin pressure may be expressed as an equivalent altitude. In theses embodiments, binary indicators 20 and 22 typically provide related conditional data, for example alarm or warning signals related to the altitude or cabin pressure, or control indicators related to the positions of various dials, switches or other control elements 24 and 25 (C1 and C2).

Panel B display 14 provides system 10 with segregated display capability for additional data having different safety and reliability priority. In some embodiments, LED elements 28 and 30 provide avionics control information related to the first priority data on panel A display 12, for example using individual indicators P1, P2 and P3 to show the position of valves or other control elements, as determined by switches S1 and S2. In one such embodiment, the valves regulate cabin pressure by mixing air at altitude (ambient pressure) with a compressed air reservoir, with flow rates and system pressure or temperature data provided on analog display 23 and alphanumeric display 26.

In general, panel displays 12 and 14 provide aviation data with different priorities, and the panel displays are positioned in different cockpit locations. In some embodiments, for example, cabin pressure control relies primarily on the atmospheric and cabin pressure data provided on panel A display 12, which is located in an overhead area of the cockpit. Panel B display 14 provides related valve position or system pressure data, and is located to the side.

Thus the relevant avionics functions typically depend primarily on the aviation data and control elements in panel A display 12, and secondarily on the aviation data and control elements in panel B display 14. To the extent that secondary control elements are provided on panel B display 14, moreover (e.g., valve switches S1 and S2), their positions may be inferred from the controls themselves, even if the LED indicators fail. This may result in a loss of some data, for example flow rates and system pressures or temperatures, and feedback data on the actual valve positions. Nonetheless, functional control is still possible based on the data provided on panel A display 12, independently of the condition of panel B display 14.

As a result, panel A data are assigned a higher display priority (first priority), and panel B data are assigned a lower display priority (second priority). In the event of a system failure, therefore, display system 10 provides a backup or failsafe logic module to ensure the continued availability of higher-priority data on panel A display 12, even if panel B display 14 fails; that is, even when the lower-priority data are not displayed.

Depending on embodiment, panel displays 12 and 14 are also utilized for a range of other environmental functions including pressure or temperature control in any of the cabin, cockpit, cargo bay or galley areas, or for other aviation functions including, but not limited to, airspeed, thrust, pitch, yaw, roll, climb, descent or flight path control. The particular configuration of panel displays 12 and 14 in FIG. 1 is thus merely representative, and the various alphanumeric, analog, and binary display elements vary from embodiment to embodiment. In addition, either panel A display 12 or panel B display 14 may display the higher (or lower) priority data, in which case the brightness and backup control configuration varies accordingly.

Figure 2:
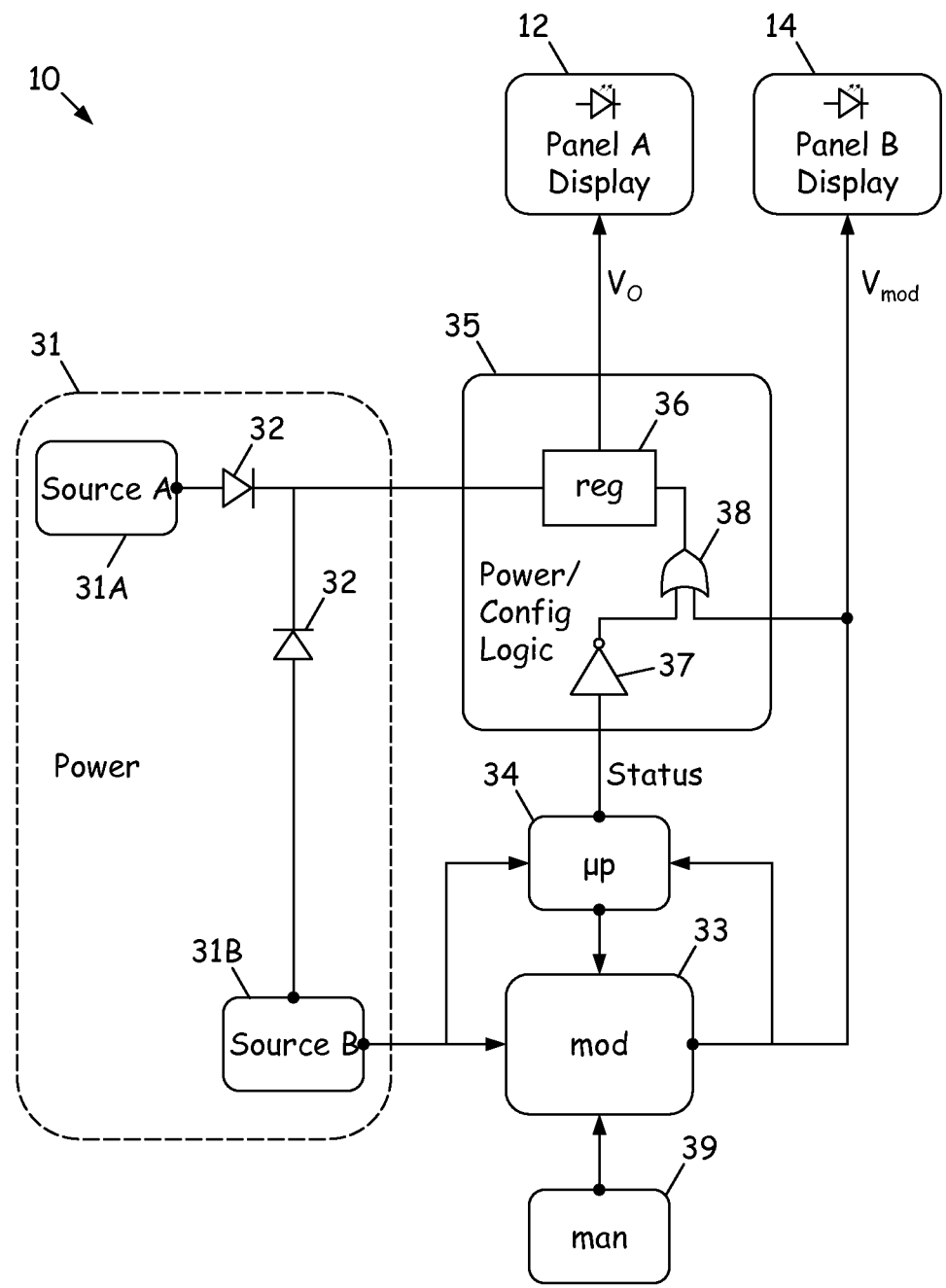
FIG. 2 is a schematic diagram of the cockpit display, illustrating an embodiment of the brightness control logic.

FIG. 2 is a schematic of cockpit display system 10, illustrating one embodiment of the brightness control logic. Display system 10 comprises panel displays 12 and 14, as described above, with power source 31, modulator 33, processor (or microprocessor) 34 and failsafe (backup) power logic module 35.

Power source 31 comprises voltage sources A and B, as provided in one or more individual power units, which are either jointly controlled, or independently powered and regulated. Typically, power source 31 provides an unmodulated or constant direct current source voltage, for example about +5 V DC or about −5 V DC. In other embodiments, the source voltage varies over a range of ±6 V, ±12 V, ±24 V or more.

Voltage sources 31A and 31B are connected to power logic module 35 in parallel using an "OR" diode gate configuration comprising two or more individual diodes. This ensures backup power when either source fails. Voltage Source 31B is also connected to modulator 33 and processor 34, which provide primary brightness control.

Modulator 33 is configured to modulate voltage source 31B, with processor 34 controlling modulator 33. In particular, processor/controller 34 controls the modulation frequency and pulse width of modulated output $V_{mod}$, in order to adjust the brightness of panel displays 12 and 14 according to the ambient light level, or based on the position of manual brightness control element 39.

Modulator 33 is connected to the unmodulated output of voltage source 31B, and provides modulated voltage $V_{mod}$ to both panel B display 14 and power logic module 35. Processor 34 is connected to modulator 33 via a feedback loop, in order to control modulator 33 and generate a status signal based on the condition of modulated voltage output $V_{mod}$. The status signal is connected to failsafe power logic module 35.

Power logic module 35 comprises regulator 36 and a number of logic elements, for example inverter (NOT) gate 37 and logic (OR) gate 38. In the particular embodiment of FIG. 2, the input of regulator 36 is connected in parallel to both voltage source 31A and voltage source 31B via diodes 32, as described above, and the output of regulator 36 is connected to panel A display 12. The input of NOT gate 37 is connected to the status signal on processor 34, and the output is connected to a first input on logic gate 38. A second input of logic gate 38 is connected to modulated voltage output $V_{mod}$ from modulator 33, and the output is connected to the reference input on regulator 36.

Failsafe power logic module 35 provides for secondary or backup brightness control of panel A display 12, without duplicating the complex modulation circuitry of primary controller (modulator) 33 and processor 34. In particular, power logic module 35 is configured to supply failsafe output voltage $V_O$ to panel A display 12 when modulator 33 or primary processor/controller 34 experiences a failure or other error condition, which could otherwise result in the loss of high-priority aviation data.

In operation of system 10, processor 34 and modulator 33 control the brightness of panel displays 12 and 14 by modulating voltage $V_{mod}$ between a first value above the LED threshold and a second value below the threshold, for example between 0 and ±5 V DC, or at another voltage range as described above. The display brightness is determined by varying the duty cycle of the pulse, or the fraction of time the voltage is held above the LED threshold. This determines what fraction of the time LED displays are on, as compared to the time below threshold when the LEDs are off.

This technique is referred to as pulse width modulation (PWM). In contrast with simple incandescent lighting systems, which are typically dimmed using variable resistors or rheostats, PWM techniques require more complex electronic circuitry, including digital logic components. This is because LED devices are characterized by a diode voltage rather than an analog resistance, so rheostat-type (analog) devices would simply turn the LEDs on or off when the output voltage crossed the diode threshold. In order to avoid visible flicker, moreover, processor 34 typically selects a pulse modulation frequency or at least 60 hertz (60 Hz) or more, or as high as 120 Hz or more, in order to substantially exceed the flicker fusion threshold for human perception.

To reduce cost and complexity, the entire flight deck panel is often centrally dimmed, including the segregated safety and reliability functions on panel A display 12 and panel B display 14. Because modulator 33 and processor 34 are common to both displays, however, some failure conditions may result in the loss of both high and low priority aviation data.

Failsafe power logic module 35 addresses this concern by providing a simple, robust, non-processor dependent backup circuit to power panel A display 12 when modulator 33 or processor 34 fails, or when there is another error condition affecting modulated voltage $V_{mod}$. In particular, power logic module 35 provides failsafe output voltage $V_O$, which switches between the modulated (PWM) voltage and the unmodulated (constant) source voltage, depending on the status signal from processor 34.

Under normal or nominal conditions (i.e., a first operating condition), processor 34 directs modulator 33 to generate PWM voltage $V_{mod}$ with the desired frequency and duty cycle. PWM voltage $V_{mod}$ is provided directly to panel B display 14, in order to dim or brighten the display according to the ambient light level, or other control input such as manual dimmer control 39.

Processor 34 also generates a status signal based on the condition of PWM voltage $V_{mod}$. Under nominal (or normal) operating conditions, the status signal has a positive or high logic value. This indicates that modulator 33 and processor 34 are functioning correctly, and that PWM voltage $V_{mod}$ is modulated within the operational display range of panel displays 12 and 14. For typical cockpit displays, this corresponds to a PWM signal amplitude spanning the characteristic or threshold voltage of the LED elements in the display elements, for example about 1.5 V to 2.0 V or more.

The status signal is inverted by NOT gate 37, which converts the high status signal to a low or negative logic signal for input to logic (OR) gate 38. The second input is connected to PWM voltage $V_{mod}$, so, under normal operating conditions, the output of OR gate 38 has the same logic value as PWM voltage $V_{mod}$. This output is connected to the reference input on regulator 36, which regulates the source voltage accordingly (that is, voltage source 31A or 31B, as determined by the diode gates and source voltage values).

When system 10 is functioning correctly, the output of regulator 36 thus has the same modulation frequency and duty cycle as PWM voltage $V_{mod}$, and panel A display 12 has substantially the same brightness as panel B display 14. Power logic module 35 simply passes PWM voltage $V_{mod}$ from modulator 33 to panel A display 12, and the brightness of both panel displays is simultaneously controlled by processor 34.

When processor 34 detects an error indicating a failure condition for modulated voltage $V_{mod}$, the status signal switches to a negative or low logic state. This occurs either when modulated voltage $V_{mod}$ falls outside the desired operating range, or when modulator 33 or processor 34 experiences a power failure, logic fault or other error condition. Such errors are due to a range of effects including power loss, static discharge, condensation, electrical shorts, lightning strikes and flight emergencies.

These errors typically result in data loss and other display failures affecting one or both of panel A display 12 and panel B display 14. On receiving such a "low error" signal from processor 34, NOT gate 37 inverts the signal to generate a positive or high input for logic gate 38, which latches high as long as the error condition is reported, regardless of the actual value of modulated voltage $V_{mod}$. This switches output voltage $V_O$ of regulator 36 from modulated voltage $V_{mod}$ to the unmodulated (source) voltage provided by source A or source B, which has an effective duty cycle of 100%.

As a result, panel A display 12 switches to a full bright or "constant on" brightness level whenever the status signal indicates a failure condition related to modulated voltage $V_{mod}$, including errors in modulator 33 or microprocessor 34. This ensures that the first priority aviation data default to full-bright on the error signal, regardless of the actual condition of voltage source $V_{mod}$, which spike either high or low, or oscillate unpredictably. The error signal thus overrides the modulated voltage output to provide fail-safe display of the first-priority data on panel A display 12, independently of whether the second-priority data are displayed on panel B display 14 or not.

Note, however, that the particular configuration of display system 10 is merely representative. In some embodiments, for example, panel displays 12 and 14 are reversed, with corresponding changes to power supply 31, modulator 33 and power logic module 35. Depending upon the logic scheme, moreover, inverter 37 is sometimes absent, or more than one inverter gate is used, and logic gate 38 comprises any of an OR, NOR, AND or NAND gate, or a combination thereof.

In each of these embodiments, power logic module 35 provides a simple backup or failsafe control system to prevent the loss of high-priority aviation data without the need for a duplicate processor-based dimming controller. This improves system reliability while reducing part count, size, weight and cost. The full-bright condition of panel A display 12 also provides a visual error indicator when one or both of primary controller/modulator elements 33 and 34 fail, and ensures maximum visibility for flight-critical (primary, or first priority) aviation data in the event of an in-flight emergency or other hazardous condition, even when system 10 is unable to maintain the supplementary (secondary, or second priority) aviation data on panel B display 14.

While this invention has been described with reference to exemplary embodiments, it will be understood by those skilled in the art that various changes may be made and equivalents may be substituted without departing from the scope of the invention. In addition, modifications may be made to adapt particular situations or materials to the teachings of the invention, without departing from the essential scope thereof. The invention is not limited to the particular embodiments disclosed herein, but includes all embodiments falling within the scope of the appended claims.

The invention claimed is:

1. A display system comprising:
    a first LED panel for displaying first priority aviation data;
    a second LED panel for displaying second priority aviation data;
    a power supply for powering the first and second LED panels;
    a modulator for modulating the power supply to generate a modulated voltage output for the second LED panel, such that the second priority aviation data are displayed at a modulated brightness level;
    a processor for controlling the modulator, wherein the processor generates an error signal indicative of failure of the modulated voltage output;
    a logic gate for switching the first LED panel from the modulated voltage to an unmodulated voltage based on the error signal, such that the first priority aviation data switch from the modulated brightness level to a full brightness level when the error signal indicates the failure condition.

2. The display system of claim 1, wherein the processor controls the modulator to provide pulse width modulation of the modulated voltage based on an ambient light level.

3. The display system of claim 1, further comprising a regulator for regulating the power supply to generate the unmodulated voltage.

4. The display system of claim 3, wherein the logic gate switches the regulator from the modulated voltage to the unmodulated voltage based on the failure condition.

5. The display system of claim 3, wherein the power supply comprises first and second voltage sources connected to the regulator in parallel.

6. The display system of claim 5, wherein the second voltage source is connected to the modulator.

7. The display system of claim 1, wherein the first priority aviation data describe an ambient pressure or altitude.

8. The display system of claim 7, wherein the first priority aviation data further describe a cabin pressure or equivalent altitude.

9. The display system of claim 8, wherein the second priority data describe a control element for regulating the cabin pressure or equivalent altitude based on the ambient pressure or equivalent altitude.

10. A cockpit display comprising:
    a first LED panel to for first priority aviation data;
    a second LED panel for second priority aviation data;
    a power supply for the first and second LED panels, the power supply having an unmodulated voltage;
    a modulator connected to the power supply and the second LED panel, wherein the modulator generates a modulated voltage to display the first priority aviation data at a modulated brightness;
    a processor connected to the modulator, wherein the processor generates an error signal indicative of a failure condition of the modulated voltage; and
    a power logic module connected to the power supply, the modulator and the processor, wherein the power logic module switches from the modulated voltage to the unmodulated voltage based on the error signal, such that the second priority aviation data default from the modulated brightness to full brightness when the error signal indicates the failure condition.

11. The cockpit display of claim 10, wherein the processor controls the modulated voltage based on an ambient light level.

12. The cockpit display of claim 10, wherein the first priority aviation data describe a cabin pressure or equivalent altitude and the second priority aviation data describe a control element for regulating the cabin pressure or equivalent altitude.

13. The cockpit display of claim 12, wherein the error condition indicates failure of the second LED panel to display a position of the control element.

14. The cockpit display of claim 10, wherein the power logic module comprises a regulator for regulating the modulated voltage and logic gate for switching the regulator to the unmodulated voltage based on the error condition.

15. The cockpit display of claim 14, wherein the power supply comprises a first voltage source connected to regulator and a second voltage source connected to the modulator.

16. The cockpit display of claim 15, wherein the second voltage source is connected to the regulator in parallel with the first voltage source.

17. A cockpit display comprising:
- first LED panel display for first priority data describing a cabin pressure or equivalent altitude;
- a second LED panel display for second priority data describing a control element for regulating the cabin pressure or equivalent altitude;
- a power supply for powering the first and second LED panels;
- a modulator for modulating the voltage supply to generate a modulated output for the first and second LED panels, such that the first and second priority data are displayed at a modulated brightness level based on ambient light;
- a microprocessor for controlling the modulator and for generating an error signal based on a failure condition of the modulated output;
- a regulator for regulating the power supply to generate an unmodulated output for the first LED panel; and
- a logic gate for switching the first LED panel display from the modulated output to the unmodulated output based on the error signal, such that the first priority aviation data default from the modulated brightness level to full brightness based when the error signal indicates the failure condition.

18. The cockpit display of claim 17, wherein the power supply comprises a first voltage source connected to the power logic module and a second voltage source connected to the modulator.

19. The cockpit display of claim 18, wherein the power logic module comprises a regulator connected to the first voltage source and the first LED panel.

20. The cockpit display of claim 19, wherein the power logic module comprises a logic gate to switch the regulator from the modulated output to the unmodulated output based on the error signal.

* * * * *